United States Patent
Norimatsu et al.

(10) Patent No.: US 7,635,226 B2
(45) Date of Patent: Dec. 22, 2009

(54) BEARING APPARATUS FOR A WHEEL OF VEHICLE

(75) Inventors: Takayuki Norimatsu, Iwata (JP); Hiroya Kato, Iwata (JP); Akira Fujimura, Iwata (JP); Isao Hirai, Iwata (JP); Kikuo Fukada, Iwata (JP)

(73) Assignee: NTN Corporation (JP)

( * ) Notice: Subject to any disclaimer, the term of this patent is extended or adjusted under 35 U.S.C. 154(b) by 28 days.

(21) Appl. No.: 12/187,627

(22) Filed: Aug. 7, 2008

(65) Prior Publication Data

US 2009/0028485 A1    Jan. 29, 2009

Related U.S. Application Data

(63) Continuation of application No. PCT/JP2007/050612, filed on Jan. 17, 2007.

(30) Foreign Application Priority Data

Feb. 7, 2006 (JP) .............................. 2006-029329

(51) Int. Cl.
   *F16C 13/00* (2006.01)
(52) U.S. Cl. ..................................... 384/544
(58) Field of Classification Search ................. 384/544, 384/589
   See application file for complete search history.

(56) References Cited

U.S. PATENT DOCUMENTS

| 6,702,472 B2 * | 3/2004 | Sera et al. .................. 384/544 |
| 7,393,140 B2 * | 7/2008 | Norimatsu et al. ........... 384/448 |
| 2003/0063827 A1 * | 4/2003 | Webb et al. ................. 384/544 |

FOREIGN PATENT DOCUMENTS

| DE | 10305084 A1 * | 8/2003 |
| JP | 11-129703 | 5/1999 |
| JP | 2002-139060 | 5/2002 |
| JP | 2003-048405 | 2/2003 |
| JP | 2005-140192 | 6/2005 |
| JP | 2005-163978 | 6/2005 |
| JP | 2005-212713 | 8/2005 |

* cited by examiner

*Primary Examiner*—Thomas R Hannon
(74) *Attorney, Agent, or Firm*—Harness, Dickey & Pierce, P.L.C.

(57) ABSTRACT

A vehicle wheel bearing apparatus is formed as a unit and has a wheel hub with a wheel mounting flange at one end. A cylindrical portion extends from the wheel mounting flange, via a shoulder portion. A wheel bearing, formed by a double row rolling bearing, is press fit onto the cylindrical portion of the wheel hub. The wheel bearing has an outer member formed with double row outer raceway surfaces on its inner circumferential surface. A pair of inner rings, formed with inner raceway surfaces, is arranged opposite to the double row outer raceway surfaces. The rings are press fit onto the cylindrical portion of the wheel hub, via a predetermined interference. One ring abuts the shoulder portion. Double row rolling elements are freely rollably contained between the opposed inner and outer raceway surfaces, via cages. The inner rings are axially immovably secured by a caulked portion. The caulked portion is formed by plastically radially outwardly deforming the end portion of the cylindrical portion. The inner circumferential surfaces of one end of the inner rings are formed with predetermined chamfer portions. The chamfer portion of the inner ring of the inner side is smaller than the chamfer portion of the inner ring of the outer side.

5 Claims, 4 Drawing Sheets

[Fig 1]
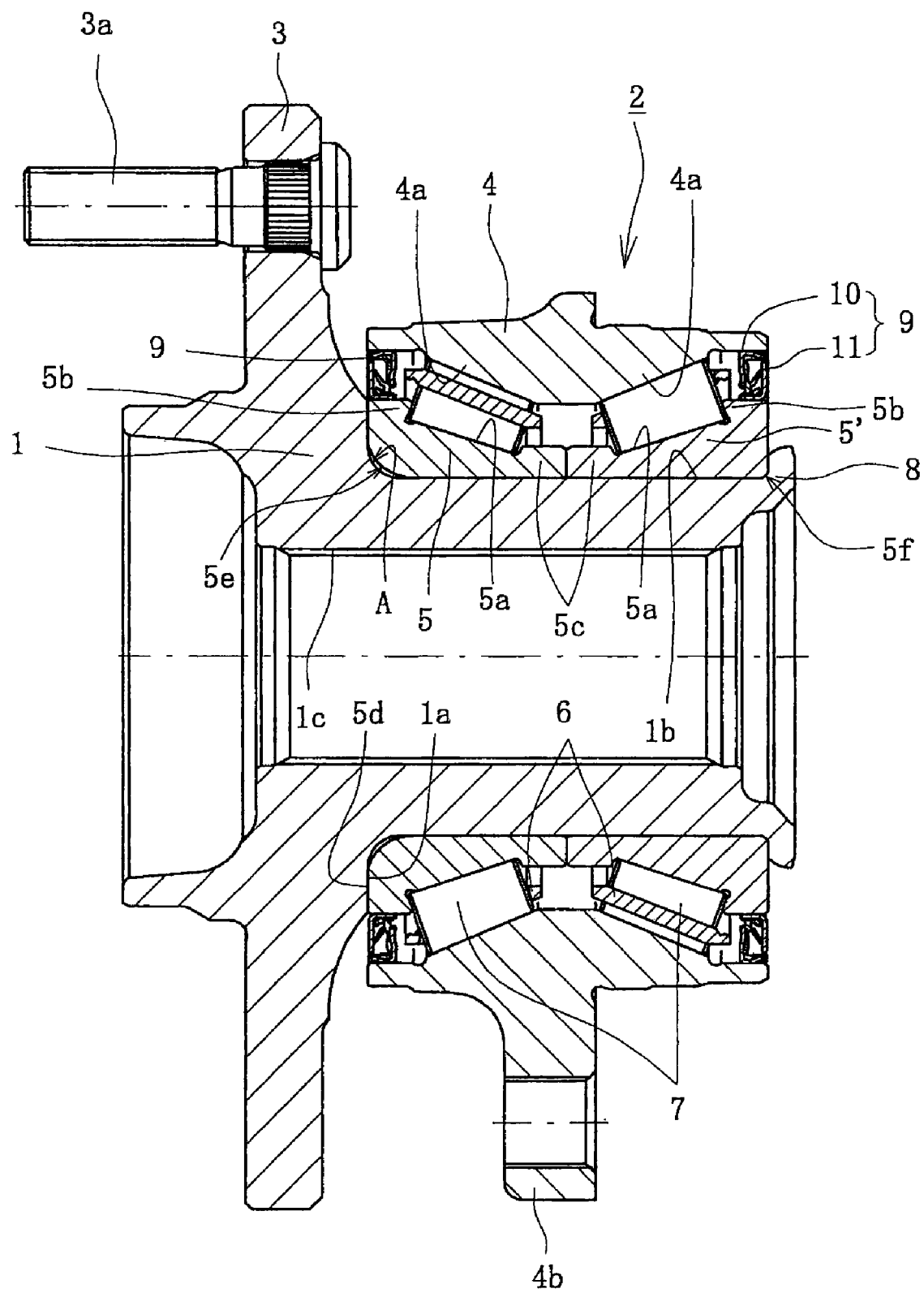

[Fig 2]
(a)
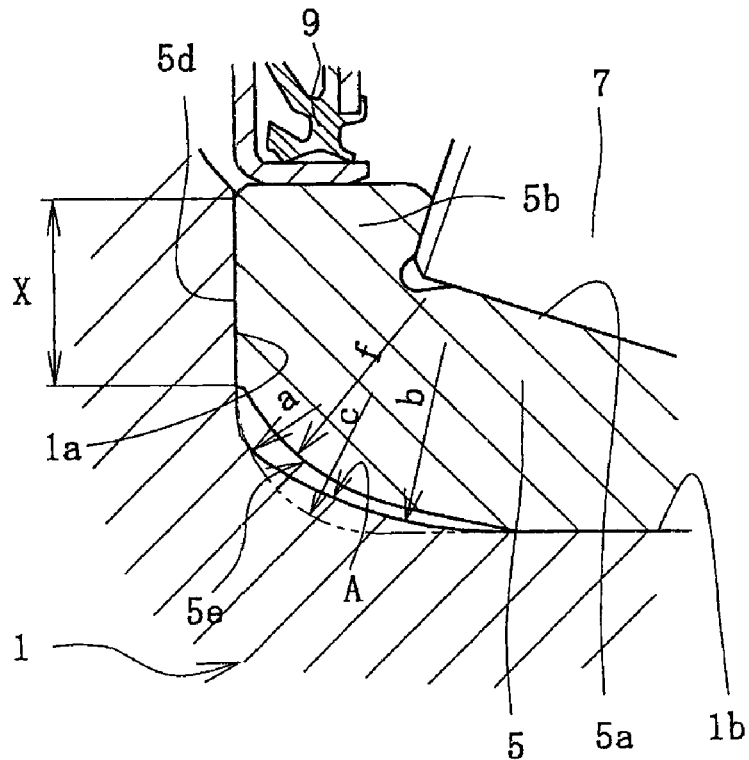
(b)
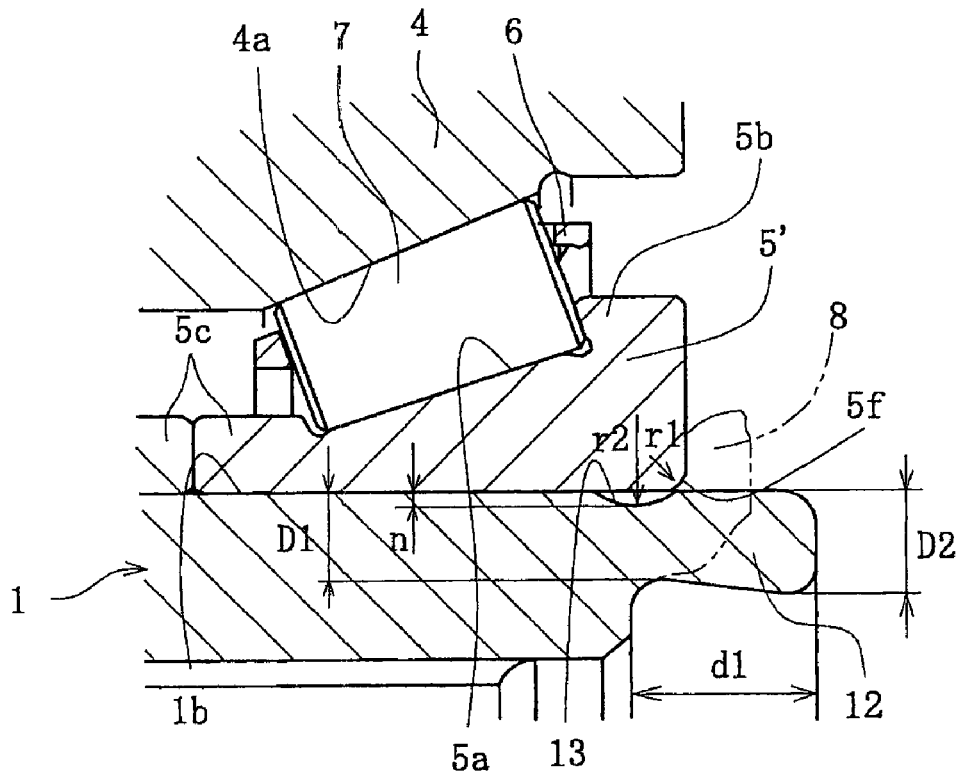

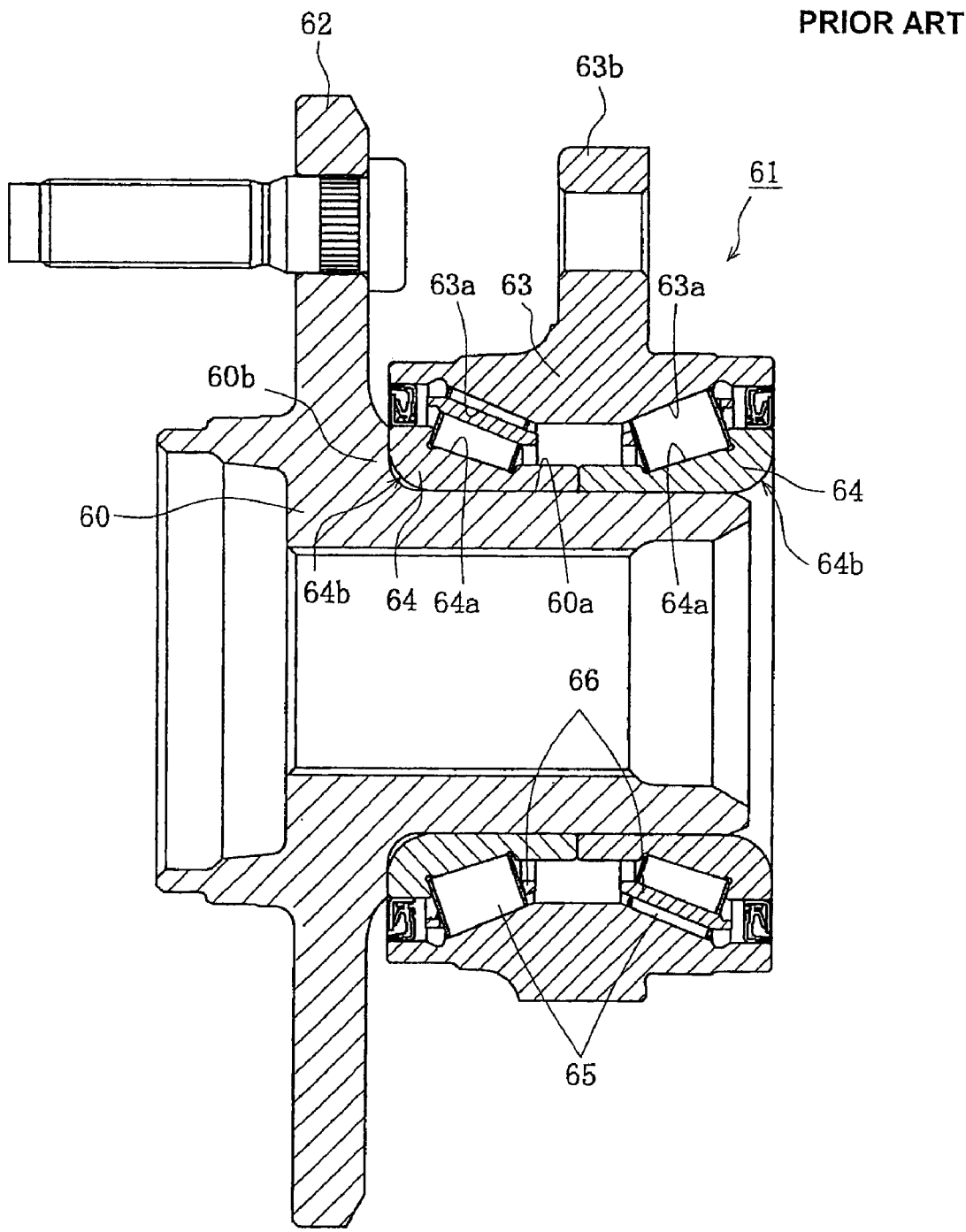
[Fig 3]
PRIOR ART

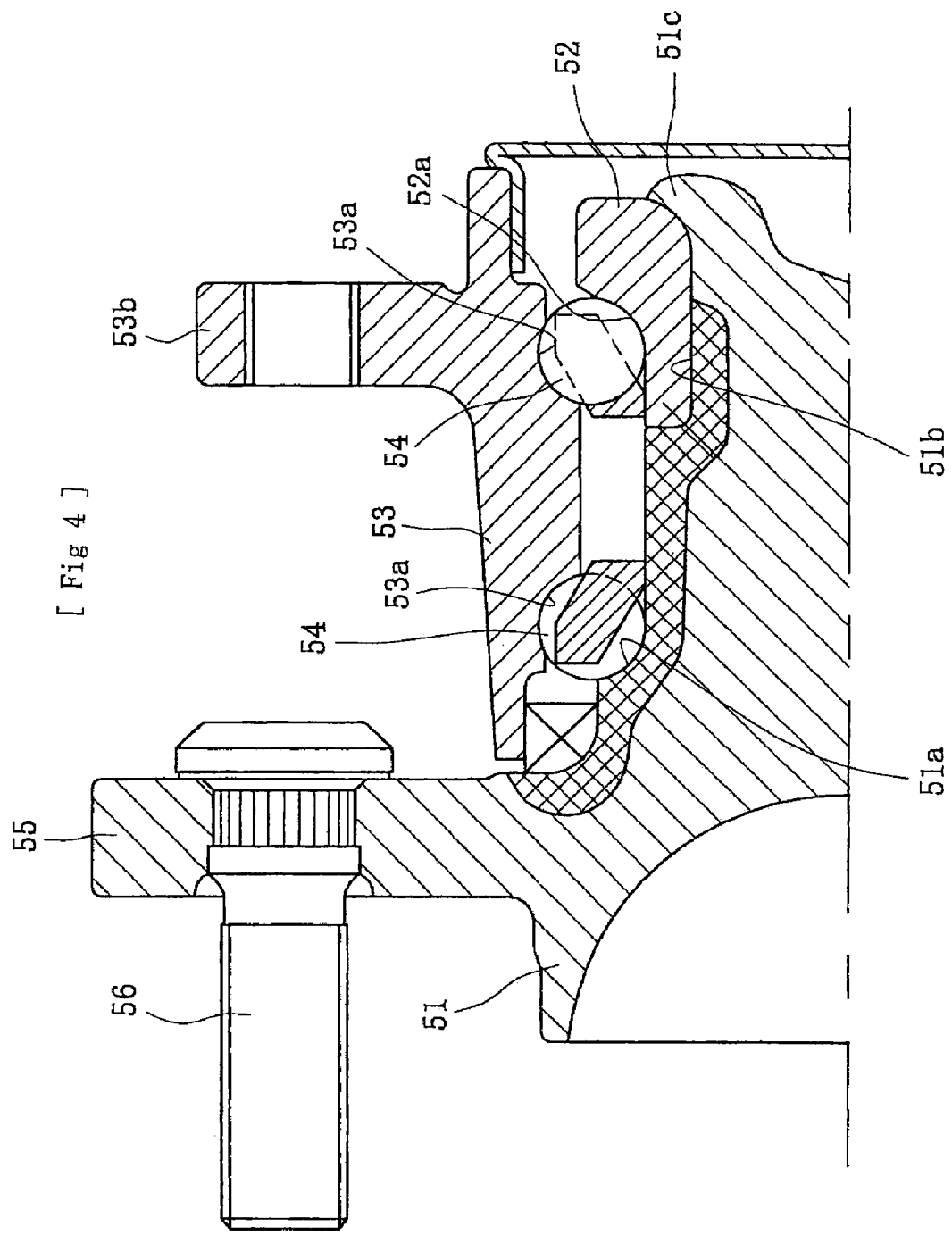
[ Fig 4 ]
PRIOR ART

BEARING APPARATUS FOR A WHEEL OF VEHICLE

CROSS-REFERENCE TO RELATED APPLICATIONS

This application is a continuation of International Application No. PCT/JP2007/050612, filed Jan. 17, 2007, which claims priority to Japanese Application No. 2006-029329, filed Feb. 7, 2006. The disclosures of the above applications are incorporated herein by reference.

FIELD

The present disclosure relates to a vehicle bearing apparatus, such as an automobile, that rotatably supports a wheel relative to a suspension apparatus and, more particularly, to a vehicle bearing apparatus with a self-retaining structure. The inner rings are secured by swing caulking of a wheel hub which suppresses deformation of the inner rings due to the caulking process. This improves the strength and durability of the inner ring.

BACKGROUND

The vehicle bearing apparatus, such as an automobile, that rotatably supports the wheel relative to a suspension apparatus, via double row rolling bearing, is of two types, one for a driving wheel and one for a driven wheel. As one representative example of a structure of the prior art, a vehicle bearing apparatus for a driving wheel is shown in FIG. 3. In the description below, the term "outboard side" (left-hand side in drawings) of the apparatus denotes a side that is positioned outside of the vehicle body. The term "inboard side" (right-hand side in drawings) of the apparatus denotes a side that is positioned inside of the body when the bearing apparatus is mounted on the vehicle body.

The bearing apparatus is a so called second generation and has a wheel hub 60 and a wheel bearing 61. The wheel hub 60 has, at one end, an integrally formed wheel mounting flange 62. A cylindrical portion 60a extends axially from the wheel mounting flange 62. The wheel bearing 61 is press fit onto the cylindrical portion 60a via a predetermined interface.

The wheel bearing 61 has an outer member 63 with a body mounting flange 63b on its outer circumferential surface and double row tapered outer raceway surfaces 63a, 63a on its inner circumference surface. A pair of inner rings 64, 64 is inserted into the outer member 63. The inner rings are formed with tapered inner raceway surfaces 64a on their outer circumferential surfaces. The tapered inner raceway surfaces 64a are arranged opposite to the double row outer raceway surfaces 63a, 63a. Double row tapered rollers 65, 65 are contained between the inner and outer raceway surfaces 64a, 63a. Cages 66 rollably hold the double row tapered rollers 65, 65 in place.

The wheel bearing apparatus of the second generation type has advantages of enabling standardization of the wheel bearing 61 and reducing manufacturing cost due to its mass production. On the contrary, there is a desired not only for the reduction of manufacturing cost but for reduction of weight and size of the wheel bearing apparatus. Thus, a wheel bearing apparatus of a third generation type, as shown in FIG. 4, has been proposed. It has a wheel hub and a wheel bearing with a double row rolling bearing formed as a unit.

This third generation type wheel bearing apparatus has a wheel hub 51, an inner ring 52, an outer ring 53 and double row balls 54, 54. The wheel hub 51 has an integrally formed wheel mounting flange 55 on its one end. On its outer circumferential surface, it includes an inner raceway surface 51a. A cylindrical portion 51b extends axially from the surface 51a. Hub bolts 56, for securing a wheel (not shown) on the flange 55, are arranged equidistantly along the periphery of the flange 55.

The inner ring 52 is formed with an inner raceway surface 52a, of the inner side, on its outer circumferential surface. The inner ring 52 is press fit onto the cylindrical portion 51b of the wheel hub 51. The inner ring 52 is axially immovably secured by a caulking portion 51 to prevent it from slipping off of the cylindrical portion 51b. The caulked portion 51c is formed by radially outwardly plastically deforming the end portion of the cylindrical portion 51b.

The outer ring 53 is integrally formed with a body mounting flange 53b on its outer circumferential surface. Also, it is formed with double row outer raceway surfaces 53a, 53a on its inner circumferential surface. Double row rolling elements 54, 54 are freely rollably contained between the opposing outer raceway surfaces 53a, 53a and the inner raceway surfaces 51a, 52a.

The wheel hub 51 is made of carbon steel including carbon of 0.40~0.80% by weight. It is formed with a hardened layer (shown by cross-hatching) in a region from the base of the wheel mounting flange 55 to the cylindrical portion 51b through the inner raceway surface 51a. The hardened layer is formed by high frequency induction hardening. The caulked portion 51c remains as its original surface hardness after forging. The inner ring 52 is made of high carbon chrome bearing steel such as SUJ2 and is hardened to its core by quenching.

Thus, it is possible to realize a vehicle wheel bearing apparatus with low cost that has sufficient durability, prevents the generation of damage such as cracks on the caulked portion 51c, and also prevents the generation of large change in the diameter of the inner ring 52 secured on the wheel hub 51 by the caulked portion 51c. Also, it is possible to reduce the potential for the inner ring 52 to be damaged by the securing work, to maintain the pre-load at a appropriate value, and also to reduce the number of parts and steps of machining and assembly process (see Japanese Laid-open Patent Publication No. 129703/1999).

SUMMARY

It is possible to apply the so-called "self-retaining structure" (structure where the inner rings are secured by the caulked portion formed on the end portion of the wheel hub) to a wheel bearing apparatus of the second generation type shown in FIG. 3. However, several problems are caused when securing the pair of inner rings 64, 64 onto the end portion of the cylindrical portion 60a of the wheel hub 60 by forming the caulking portion. That is, since the same inner rings 64 are used both in the inner and outer sides, it is inevitable that a large chamfer portion 64b is formed on the inner circumferential surface of each inner ring 64. Accordingly, the inner ring 64 of the inner side tends to be radially outwardly expanded when the end portion of the cylindrical portion 60a is swing caulked. Thus, not only is the inner ring 64 deformed and causes the bearing gap to be larger than the predetermined value but an excessive hoop stress is created on the outer circumferential surface. Thus, the durability of the bearing apparatus is diminished.

Under the circumstances, if the chamfer portion 64b is set small, the shoulder portion 60b, which the inner ring 64 of the outer side abuts, must also be small to avoid interference.

Thus, the mechanical strength of the wheel hub 60 is diminished and excessive repeating stresses are formed on the shoulder portion 60b of the wheel hub. Thus, the durability of the wheel hub 60 is reduced.

It is, therefore, an object to provide a vehicle wheel bearing apparatus of the first or second generation that can suppress deformation of the inner ring during the caulking process to improve the mechanical strength of the wheel hub and thus the durability of the wheel bearing apparatus.

To achieve the object, a vehicle wheel bearing apparatus is formed as a unit. A wheel hub has, at its one end, a wheel mounting flange. A cylindrical portion extends from the wheel mounting flange, via a shoulder portion. A wheel bearing is formed by a double row rolling bearing press fit onto the cylindrical portion of the wheel hub. The wheel bearing has an outer member formed with double row outer raceway surfaces on its inner circumferential surface. A pair of inner rings is formed with inner raceway surfaces that are arranged opposite to the double row outer raceway surfaces. The pair is press fit onto the cylindrical portion of the wheel hub, via a predetermined interference, with one ring abutting the shoulder portion. Double row rolling elements are freely rollably contained between the opposed inner and outer raceway surfaces via cages. The inner rings are axially immovably secured by a caulked portion. The caulked portion is formed by plastically deforming the end portion of the cylindrical portion radially outward. The inner circumferential surfaces of one end of the inner rings are formed with predetermined chamfer portions. The chamfer portion of the inner ring of the inner side is smaller than that of the inner ring of the outer side.

The wheel bearing apparatus, with a self-retaining structure, has a pair of inner rings press fit onto the cylindrical portion of the wheel hub. The inner rings are axially secured relative to the wheel hub by a caulked portion that is formed by plastically deforming the end portion of the cylindrical portion of the wheel hub. The inner circumferential surfaces of one end of the inner rings are formed with predetermined chamfer portions. The chamfer portion of the inner rings of the inner side is smaller than that of the inner ring of the outer side. Thus, it is possible to suppress the deformation of the inner ring of the inner side due to the caulking process and to improve the durability of the wheel bearing apparatus. Accordingly, it is possible to provide a wheel bearing apparatus that can suppress the generation of stress at the corner portion between the shoulder portion and the cylindrical portion of the wheel hub and improve the durability of the bearing apparatus while increasing the strength of the wheel hub.

A corner portion formed between the shoulder portion and the cylindrical portion of the wheel hub has a composite radius comprising a plurality of radii of curvatures. This makes it possible to provide a wheel bearing apparatus that can assure the contacting area between the shoulder portion of the wheel hub and the larger end face of the inner ring of the outer side. Additionally, it can suppress the stress generated in the corner portion to improve the durability of the wheel hub.

The composite radius comprises two radii of curvatures "a", "b". One radius of curvature "a" is smaller than a maximum radius of curvature "c" (which is a supposed radius of curvature as the corner would be formed by a single radius). The other radius of curvature "b" is larger than the radius of curvature "c". This makes it possible to prevent interference between the chamfer portion of the inner ring of the outer side and the corner portion without excessively suppressing the dimensional dispersion. Thus, it reduces the manufacturing cost.

The chamfer portion of the inner ring of the inner side has a circular arc of a radius of curvature of 1.0~2.5 mm. Thus, it is possible to suppress the elastic deformation of the outer circumferential surface of the inner ring of the inner side. Thus, it is possible to reduce the hoop stress generated in the outer circumferential surface of the inner ring and to suppress the generation of damages, such as micro cracks, in the caulked portion.

An annular groove with a circular arc cross-section and extending to the chamfer portion of the inner ring of the inner side is formed on the outer circumferential surface of the end portion of the cylindrical portion of the wheel hub. The thickness of the end portion of the cylindrical portion before caulking is gradually increased toward its tip end portion. This makes it possible to suppress the elastic deformation of the outer circumferential surface of the inner ring of the inner side caused by the caulking load. Thus, this reduces the hoop stress generated in the outer circumferential surface of the inner ring. Additionally, it suppresses the generation of damages, such as micro cracks, in the caulked portion. In addition, the thickness of the end portion of the cylindrical portion of the wheel hub is expanded radially outwardly by the caulking tool. Thus, it is increased at the initial stage of the caulking process. The end portion of the cylindrical portion tends to rapidly fill the space of the caulking tool and thus the inner ring can be rigidly secured.

The vehicle wheel bearing apparatus is formed as a unit with a wheel hub. It has a wheel mounting flange at its one end. A cylindrical portion extends from the wheel mounting flange via a shoulder portion. A wheel bearing is formed by a double row rolling bearing press fit onto the cylindrical portion of the wheel hub. The wheel bearing has an outer member formed with double row outer raceway surfaces on its inner circumferential surface. A pair of inner rings is formed with inner raceway surfaces. The inner raceway surfaces are arranged opposite to the double row outer raceway surfaces. The rings are press fit onto the cylindrical portion of the wheel hub via a predetermined interference, with one abutting the shoulder portion. Double row rolling elements are freely rollably contained between the opposed inner and outer raceway surfaces, via cages. The inner rings are axially immovably secured by a caulked portion formed by plastically radially outwardly deforming the end portion of the cylindrical portion. The inner circumferential surfaces of one end of the inner rings are formed with a predetermined chamfer portions. The chamfer portion of the inner ring of the inner side is smaller than that of the inner ring of the outer side. Thus, it is possible to suppress the deformation of the inner ring of the inner side due to the caulking process. This improves the durability of the wheel bearing apparatus. Thus, it is possible to provide a wheel bearing apparatus that can suppress the generation of stress at the corner portion between the shoulder portion and the cylindrical portion of the wheel hub and improve the durability of the bearing apparatus while increasing the strength of the wheel hub.

A vehicle wheel bearing apparatus is formed as a unit with a wheel hub including a wheel mounting flange at its one end. A cylindrical portion extends from the wheel mounting flange, via a shoulder portion. A wheel bearing is formed by a double row rolling bearing press fit onto the cylindrical portion of the wheel hub. The wheel bearing includes an outer member formed with double row outer raceway surfaces on its inner circumferential surface. A pair of inner rings is formed with inner raceway surfaces. The inner raceway surfaces are arranged opposite to the double row outer raceway surfaces. The rings are press fit onto the cylindrical portion of the wheel hub via a predetermined interference with one abutting the shoulder portion. Double row rolling elements are freely rollably contained between the opposed inner and outer raceway surfaces, via cages. The inner rings are axially immovably secured by a caulked portion that is formed by plastically radially outwardly deforming the end portion of the cylindrical portion. A corner portion between the shoulder portion and the cylindrical portion of the wheel hub is formed by a composite radius. The composite radius comprises a plurality of radii of curvatures. The inner circumferential surfaces of one end of the inner rings are formed with predetermined chamfer portions. The chamfer portion of the inner ring of the inner side is smaller than that of the inner ring of the outer side.

Further areas of applicability will become apparent from the description provided herein. The description and specific examples in this summary are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

FIG. 1 is a longitudinal section view of one embodiment of a vehicle wheel bearing apparatus.

FIG. 2(a) is a partially enlarged view of FIG. 1.

FIG. 2(b) is a partially enlarged view of FIG. 1 with the wheel hub and an inner ring before caulking.

FIG. 3 is a longitudinal section view of a prior art vehicle wheel bearing apparatus.

FIG. 4 is a longitudinal section view of another prior art vehicle wheel bearing apparatus.

DETAILED DESCRIPTION

A preferable embodiment will be described with reference to the accompanying drawings.

FIG. 1 is a longitudinal section view of one embodiment of a vehicle wheel bearing apparatus. FIG. 2(a) is a partially enlarged view of FIG. 1. FIG. 2(b) is a partially enlarged view of FIG. 1 with a wheel hub and an inner ring before caulking.

The vehicle wheel bearing apparatus has a structure of a so called second generation for a driving wheel. It includes a wheel hub 1 and a wheel bearing 2 fit onto the wheel hub 1. The wheel hub 1 has, at its one end of the outer side, a wheel mounting flange 3 to mount a wheel (not shown). A cylindrical portion 1b extends from the wheel mounting flange 3, via a shoulder portion 1a. A serration (or spline) 1c, for torque transmission, is formed on the inner circumferential surface of the wheel hub 1. In addition, hub bolts 3a, to secure a wheel to the flange 3, are equidistantly arranged along the periphery of the flange 3.

The wheel hub 1 is made of medium carbon steel including carbon of 0.40~0.80% by weight such as S53C. The wheel hub 1 is hardened by high frequency induction to have a surface hardness of 58~64 HRC. The hardening is over a region from the shoulder portion 1a, at a base of the wheel mounting flange 3, to the cylindrical portion 1b. The caulking portion 8 remains as a non-quenched portion with a surface hardness below 25 HRC after forging. This provides an increase in the strength of the wheel hub 1 and suppresses fretting wear at the fitting surfaces of the inner rings 5, 5'. In addition, it is possible to improve workability of the caulking portion 8 and to prevent the generation of cracks due to plastic deformation.

The wheel bearing 2 includes an outer member 4 integrally formed with a body mounting flange 4b on its outer circumferential surface. The body mounting flange 4b is mounted on a body (not shown) of a vehicle. A pair of inner rings 5, 5', each formed with tapered inner raceway surface 5a, is arranged opposite to the double row outer raceway surfaces 4a, 4a. Double row rolling elements (tapered rollers) 7, 7 are freely rollably contained between the opposed inner and outer raceway surfaces, via cages 6. A larger diameter side of the inner raceway surface 5a of each inner ring 5 (5') is formed with a large flange 5b. The flange 5b guides the rolling elements 7. A smaller diameter side of the inner raceway surface 5a is formed with a small flange 5c to prevent slipping off of the rolling elements 7. The inner rings 5, 5' are set with their front end faces abutting one another to form a back-to-back double row tapered roller bearing.

The outer member 4 and the inner rings 5, 5' are made of high carbon chrome bearing steel such as SUJ2. They are hardened to the core by dip quenching to have a surface hardness of 58~64 HRC. The outer member 4 and the inner rings 5, 5' are not limited to the high carbon chrome bearing steel and may be made of medium carbon steel including carbon of 0.40~0.80% by weight such as S53C (JIS carbon steels for machine structural use of SC family) or of case hardening steel (blister steel) such as SCr430 etc. At least the surfaces of the double row outer raceway surfaces 4a, 4a may be hardened by high frequency induction quenching to have a hardness of 58~64 HRC.

The wheel bearing 2 is press fit onto the cylindrical portion 1b, via a predetermined interference. The larger end face 5d of the inner ring 5 of the outer side abuts the shoulder 1a of the wheel hub 1. The ring is secured thereon by pre-pressure applied by the caulked portion 8 when the end portion of the cylindrical portion 1b is plastically radially outwardly deformed. Thus, the self-retaining structure can be obtained that can maintain a stable pre-pressure for a long term without managing the pre-pressure by adjusting a fastening torque of a nut (not shown).

Seals 9, 9 are fit into annular openings formed between the outer member 4 and the inner rings 5, 5'. Each of the seals 9, 9 include an annular sealing plate 10 and a slinger 11. Both have a substantially L-shaped cross-section and are arranged opposite to each other to form a so-called pack seal. The seals 9, 9 prevent leakage of lubricating grease contained within the bearing. Also, the seals prevent entering of rain water or dusts into the bearing from the outside. Although illustrated in this embodiment as a double row tapered roller bearing having tapered rollers 7, 7, it is possible to use a double row angular contact ball bearing using balls.

The corner portion "A" between the shoulder portion 1a and the cylindrical portion 1b of the wheel hub 1 comprises a composite radius formed by smoothly connecting circular arcs. Shown is a plurality ("two" in the illustrated example) of radii of curvatures "a", "b". The composite radius is finished by a formed grinding wheel together with the shoulder portion 1a and a cylindrical portion 1b of the wheel hub 1 after the corner portion "A" has been hardened by high frequency induction heating (FIG. 2(a)).

One radius of curvature "a" of the composite radius is smaller than a maximum radius of curvature "c". The radius of curvature "c" is a supposed radius of curvature if the corner portion "A" was formed by a single radius. The other radius of curvature "b" is larger than the radius of curvature "c" (a<c<b). In addition, the radius of curvature "c" is set smaller than a radius of curvature "f" of the chamfer portion 5e of the inner ring 5 (c<f). This enables to increase the rigidity of the inner ring 5 while assuring an abutting length "X" between the wheel hub 1 and the larger end face 5d of the inner ring 5 in a limited space. Thus, it is possible to suppress stress caused in the corner portion "A" and to increase the strength of the wheel hub 1. Furthermore, it is possible to prevent interference of the corner portion "A" with the chamfer portion 5e without more suppression of dimensional dispersion than necessity. Thus, this reduces the manufacturing cost of the wheel bearing apparatus.

As the results of an analysis, it has been found that it is possible to reduce the stress caused in the corner portion "A" by more than 20% when the corner portion "A" is formed by the composite radius that includes a radius of curvature "a" of about 2.0~2.5 mm and a radius of curvature "b" about 7.5~8.0 mm. This is compared with the case where the corner portion "A" is formed by a single radius having a maximum radius of curvature "c" of 3.5 mm.

The end portion of the cylindrical portion 1b of the wheel hub 1 is formed as a hollow cylindrical portion 12 with a predetermined length d1 before caulking as shown in FIG. 2(b). The larger the length d1, the small caulking amount of radially outward deformation of the inner ring 5' and the strength of caulking (securing force of the inner ring) is reduced.

A thickness of the cylindrical portion 12 is formed so that it gradually increases toward the tip end from a thickness "D1", at the base of the cylindrical portion 12, to "D2" at the tip end (D1<D2). By adopting such a configuration, the thickness of the end portion of the cylindrical portion 12 of the wheel hub 1 is increased at the initial stage of the caulking process when it is radially outwardly expanded by the caulking tool. Thus, it is possible to make a short on axial length of the cylindrical portion 12 to be plastically deformed. Furthermore, since the end portion of the cylindrical portion 12 tends to rapidly fill the space of the caulking tool, it is possible to rigidly secure the inner ring 5'.

A chamfer portion 5f of the inner circumferential end portion of the inner ring 5' of the inner side is set smaller than that 5e of the inner ring 5 of the outer side. It has a circular arc cross-section of a radius of curvature r1 of about 1.0~2.5 mm. In addition, an annular groove 13, with a circular arc cross-section of a radius of curvature r2 of about 5~10 mm and a depth n of about 0.5 mm, is formed on the outer circumferential surface of the cylindrical portion 12. The annular groove 13 is formed so that it extends to the chamfer portion 5f of the inner ring 5' of the inner side. Thus, it is possible to suppress the elastic deformation of the outer circumference of the inner ring 5' caused by the caulking load. Additionally, it is possible to reduce the hoop stress generated on the outer circumference of the inner ring 5' to prevent the generation of damage, such as micro cracks, on the caulked portion 8.

Under the circumstances, it is believed that a stress concentration would be caused in the base portion of the caulked portion 8 and thus damages, such as micro cracks would be generated when the radius of curvature r1 of the chamfer portion 5f of the inner ring 5' is set smaller than 1.0 mm. Also, a bending moment load is applied to the wheel bearing apparatus during driving of the vehicle. On the contrary when the radius of curvature r1 exceeds 2.5 mm, the inner ring 5' is expanded radially outwardly during plastic deformation of the cylindrical portion 12. Thus, the outer circumference of the inner ring 5' is deformed and excessive hoop stress is caused in the outer circumference.

As described above, the wheel bearing assembly 2 is press fit onto the cylindrical portion 1b of the wheel hub 1. A pair of inner rings 5, 5' is secured relative to the wheel hub 1 by the caulked portion 8. The caulking portion is formed by swing caulking that plastically radially outwardly deforms the end portion of the cylindrical portion 1b. The inner ring 5 of the outer side abuts the shoulder portion 1a of the wheel hub 1. The chamfer portion 5f of the inner ring 5' of the inner side is set smaller than the chamfer portion 5e of the inner ring 5 of the outer side. Accordingly, it is possible to provide a wheel bearing apparatus that suppresses deformation of the inner ring 5' of the inner side (caulking side) due to the caulking process; improves its durability to increase the rigidity of the inner ring 5 of the outer side; suppresses the stress generated at the corner portion "A" between the shoulder portion 1a and the cylindrical portion 1b; and improves the durability of the bearing while increasing the strength of the wheel hub 1.

The wheel bearing apparatus can be applied to wheel bearing apparatus having a self-retaining structure of first and second generation types. A pair of inner rings is press fit onto the cylindrical portion of the wheel hub. They are secured by a caulked portion that is formed by plastically deforming the end portion of the cylindrical portion.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A vehicle wheel bearing apparatus formed as a unit comprising:
   a wheel hub with a wheel mounting flange at its one end, a cylindrical portion extending from the wheel mounting flange via a shoulder portion;
   a wheel bearing formed by a double row rolling bearing press fit onto the cylindrical portion of the wheel hub, said wheel bearing including an outer member with double row outer raceway surfaces on an the inner circumferential surface;
   a pair of inner rings, formed with inner raceway surfaces, are arranged opposite to the double row outer raceway surfaces, the rings are press fit onto the cylindrical portion of the wheel hub via a predetermined interference, one ring abuts the shoulder portion;
   double row rolling elements are freely rollably contained between the opposed inner and outer raceway surfaces via cages, said inner rings are axially immovably secured by a caulked portion, the caulking portion is formed by plastically radially outwardly deforming the end portion of the cylindrical portion, said caulking portion in tight immediate contact with the end surface of the inner ring of an inner side of the wheel bearing apparatus, inner circumferential surfaces of one end of each of the inner rings is formed with a predetermined chamfer portion, and the chamfer portion of the inner ring of the inner side of the wheel bearing apparatus is smaller than the chamfer portion of the inner ring of an outer side of the wheel bearing apparatus.

2. The vehicle wheel bearing apparatus of claim 1 wherein a corner portion between the shoulder portion and the cylindrical portion of the wheel hub is formed by a composite radius that comprises a plurality of radii of curvatures, an outer side radius of curvature is smaller than a maximum radius of curvature and an inner side radius of curvature is larger than the maximum radius of curvature.

3. The vehicle wheel bearing apparatus of claim 2, wherein the composite radius comprises two radii of curvatures.

4. The vehicle wheel bearing apparatus claim 1 wherein the chamfer portion of the inner ring of the inner side has a circular arc of a radius of curvature of 1.0~2.5 mm.

5. The vehicle wheel bearing apparatus claim 1 wherein an annular groove, with a circular arc cross-section and extending to the chamfer portion of the inner ring of the inner side, is formed on the outer circumferential surface of the end portion of the cylindrical portion of the wheel hub, and a thickness of the end portion of the cylindrical portion before caulking is gradually increased toward its tip end portion.

* * * * *